(12) United States Patent
Baron et al.

(10) Patent No.: US 10,455,632 B2
(45) Date of Patent: *Oct. 22, 2019

(54) DYNAMIC IDENTIFICATION OF NETWORK CONNECTION PREFERENCES

(71) Applicant: Microsoft Technology Licensing, LLC, Redmond, WA (US)

(72) Inventors: Drew Baron, Redmond, WA (US); Vishal Mhatre, Redmond, WA (US); Yatharth Gupta, Kirkland, WA (US); Gianluigi Nusca, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,928

(22) Filed: Feb. 7, 2017

(65) Prior Publication Data

US 2018/0152977 A1 May 31, 2018

Related U.S. Application Data

(60) Provisional application No. 62/428,450, filed on Nov. 30, 2016.

(51) Int. Cl.
*H04W 72/02* (2009.01)
*H04W 48/16* (2009.01)
(Continued)

(52) U.S. Cl.
CPC ........... *H04W 76/14* (2018.02); *H04W 8/005* (2013.01); *H04W 48/16* (2013.01); *H04W 48/12* (2013.01); *H04W 88/08* (2013.01)

(58) Field of Classification Search
None
See application file for complete search history.

(56) References Cited

U.S. PATENT DOCUMENTS 7,715,308 B2    5/2010  Ramaswamy
8,369,235 B2    2/2013  Kim et al.
(Continued)

FOREIGN PATENT DOCUMENTS

CN         105682182       6/2016
WO      WO 2015151962     10/2015

OTHER PUBLICATIONS

Mushtaq et al., "Extended Display Mode Using Android Miracast", In International Journal of Innovative Technology and Research, Apr. 17, 2015, pp. 84-86.

(Continued)

*Primary Examiner* — Eunsook Choi
(74) *Attorney, Agent, or Firm* — Klarquist Sparkman, LLP

(57) ABSTRACT

Methods and apparatus are disclosed for device discovery, pairing, and transmission of audio and video media, using preference data shared between a media sender/source node and a media receiver/sink node. In some examples of the disclosed technology, a sink node sends, via a peer-to-peer wireless communication path, a discovery message to a source node comprising a preference indication including an indication of a first one of two communication paths to use for the establishing a connection. The sink node receives a request to establish a connection between the sink node and the source node based on the indicated preference. Based on the received request, the sink node establishes a connection between the sink node and the source node. A selected communication path (e.g., peer-to-peer wireless or wireless infrastructure) can be indicated as preferred, along with additional parameters for the media connection.

17 Claims, 10 Drawing Sheets

(51) Int. Cl.
   *H04W 76/14*   (2018.01)
   *H04W 8/00*    (2009.01)
   *H04W 88/08*   (2009.01)
   *H04W 48/12*   (2009.01)

(56) References Cited

U.S. PATENT DOCUMENTS

| | | | |
|---|---|---|---|
| 8,804,545 | B2 | 8/2014 | Gesmundo et al. |
| 8,811,275 | B2 | 8/2014 | Kim |
| 9,128,524 | B2 | 9/2015 | Lee et al. |
| 9,197,680 | B2 | 11/2015 | Kafle et al. |
| 9,306,992 | B2 | 4/2016 | Praveenkumar et al. |
| 9,369,947 | B2 | 6/2016 | Lee et al. |
| 9,641,963 | B2 | 5/2017 | Park et al. |
| 10,136,311 | B2 | 11/2018 | Bhargava et al. |
| 2006/0209884 | A1* | 9/2006 | MacMullan .......... G06F 3/1454 370/465 |
| 2013/0304860 | A1 | 11/2013 | Yang et al. |
| 2014/0201415 | A1 | 7/2014 | Huang et al. |
| 2014/0334381 | A1 | 11/2014 | Subramaniam et al. |
| 2014/0351445 | A1 | 11/2014 | Davidson et al. |
| 2014/0351477 | A1 | 11/2014 | Lee et al. |
| 2014/0372620 | A1 | 12/2014 | Vedula et al. |
| 2015/0036735 | A1 | 2/2015 | Smadi et al. |
| 2015/0085847 | A1 | 3/2015 | Yamaura |
| 2015/0172757 | A1* | 6/2015 | Kafle ............... H04L 67/1044 725/81 |
| 2015/0222474 | A1 | 8/2015 | Hartley et al. |
| 2015/0327313 | A1 | 11/2015 | Kim et al. |
| 2016/0088550 | A1 | 3/2016 | Rabii et al. |
| 2016/0134929 | A1 | 5/2016 | Robii et al. |
| 2016/0164933 | A1 | 6/2016 | Kafle et al. |
| 2016/0179295 | A1 | 6/2016 | Liang et al. |
| 2016/0183317 | A1 | 6/2016 | Shao et al. |
| 2016/0205148 | A1 | 7/2016 | Lee et al. |
| 2016/0286395 | A1 | 9/2016 | Adrangi et al. |
| 2016/0316361 | A1 | 10/2016 | Bhargava et al. |
| 2017/0006117 | A1* | 1/2017 | Kafle ............... H04W 76/11 |
| 2017/0295088 | A1* | 10/2017 | van der Kluit ..... H04L 45/1287 |
| 2018/0176755 | A1 | 6/2018 | Zhao |

OTHER PUBLICATIONS

Tieu, et al., "Wi-Fi Direct Services", In Master's Thesis of Lund University, Jun. 2014, 73 pages.
Wi-Fi Alliance, "Wi-Fi Certified Miracast™: Extending the Wi-Fi experience to seamless video display", http://www.wi-fi.org/system/files/wp_Miracast_Industry_20120919.pdf, Document marked: Sep. 19, 2012, pp. 1-18.
"Non Final Office Actionn Issued in U.S. Appl. No. 15/426,902", dated, Mar. 8, 2019, 16 Pages.

* cited by examiner

DYNAMIC IDENTIFICATION OF NETWORK CONNECTION PREFERENCES

CROSS-REFERENCE TO RELATED APPLICATION

This application claims the benefit of and priority to U.S. Provisional Application No. 62/428,450, filed Nov. 30, 2016, which application is incorporated herein by reference in its entirety.

BACKGROUND

Some techniques for streaming display data, including video and audio streams in a peer-to-peer communication environment, include rendering and encoding video and audio at a sender node and transmitting the encoded data to a receiver node for display. Such data can be transmitted using a wireless communication link. However, managing and routing such data in a consumer environment offers ample opportunity for improvement in performance, security, and flexibility.

SUMMARY

Methods and apparatus are disclosed for transmitting data payloads, such as audio and/or video payloads from one or more source nodes to a sink node. The source nodes and sink nodes and sink nodes can be implemented as computing devices that include video and audio encoders and/or decoders and that initiate, pair, and transmit data between nodes using one or more wireless or wired communication paths.

In some examples, preferences for parameters of communication settings are transmitted between sink nodes and source nodes during device discovery. For example, preferences can be used to determine which of a plurality of two or more communication paths are preferred to be used for transmitting data payloads from a source node to a sink node. For example, communication preferences can be pre-defined in configuration data stored at a sink node, or based on rules configured by a system administrator based on properties of intermediate network devices, the sink node, or the source node. Based on the communicated configuration preferences and attributes of the communication paths, an appropriate communication path can be selected for transmitting data payloads. Further, additional security measures can be applied based on indicated preferences.

In some examples of the disclosed technology, a method includes sending a discovery message between the source node and the sink node with a wireless peer-to-peer (P2P) protocol, including an indication of a preference for establishing a connection, and, based on the request, establishing a connection between the sink node and the source node.

In some examples of the disclosed technology, a communication path is selected based on preference data. For example, attributes of the sink node, source node, network properties, or other attributes can be evaluate in view of the preference data to select one of a plurality of communication paths.

In some examples of the disclosed technology, additional security measures, such as disabling broadcasts or beacon functions provided by the sink node, are taken based on indicated preferences regarding communication paths between the source and the sink node. In some examples, information elements encoded in infrastructure network or peer-to-peer communication network traffic can include communication of one or more preferences used to establish and configure the connection between the source node and the sink node. In some examples, one or more of the communication paths can include a wired or optical connection. In other examples, the communication paths are mostly or entirely established using wireless communication technologies, such as Wi-Fi radio frequency (RF) communication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, any trademarks used herein remain the property of their respective owners. The foregoing and other objects, features, and advantages of the disclosed embodiments will become more apparent from the following detailed description, which proceeds with reference to the accompanying figures.

DETAILED DESCRIPTION

I. General Considerations

Figure 1:
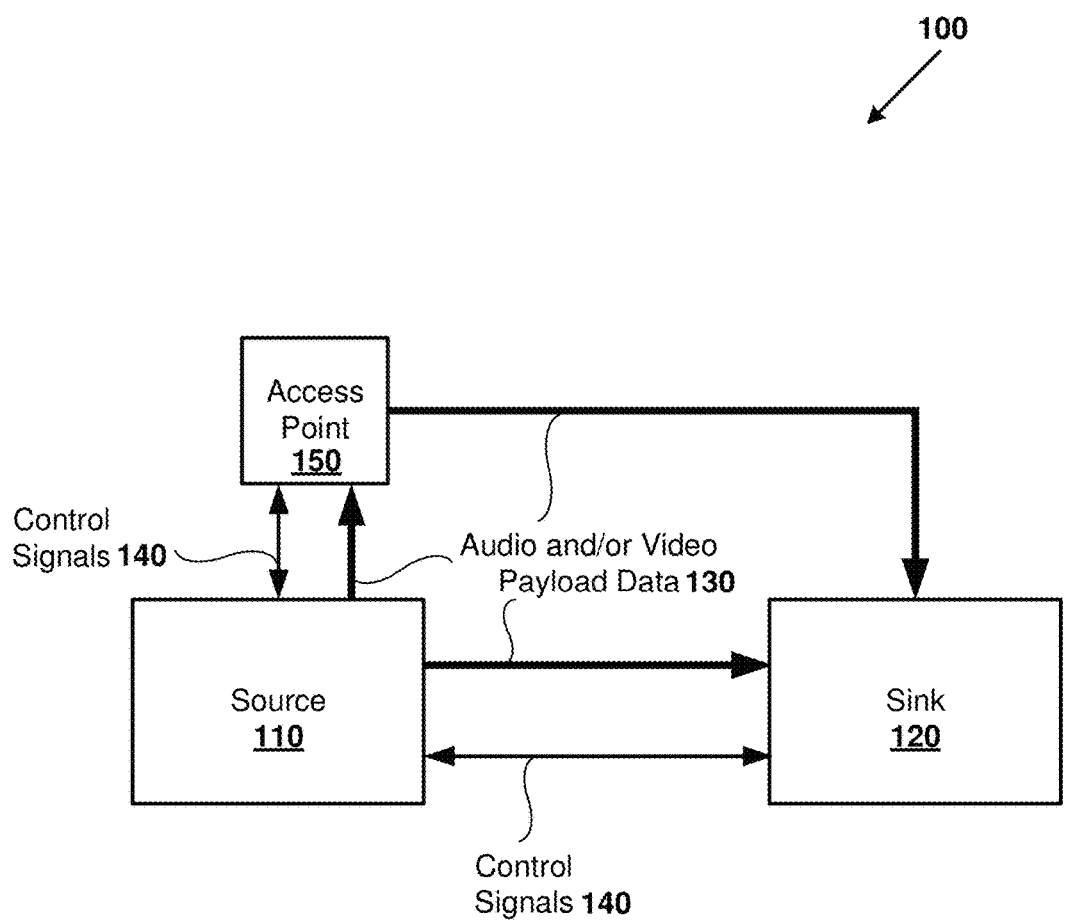
FIG. 1 is a block diagram outlining an example environment including a source node and a sink node, as can be used in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "determine," and "select" to describe the disclosed methods. These terms are high-level descriptions of the actual operations that are performed. The actual operations that correspond to these terms will vary depending on the particular implementation and are readily discernible by one of ordinary skill in the art.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., a thread executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

FIG. 1 is a block diagram 100 outlining an example environment in which disclosed apparatus and methods can be implemented. A source node 110 can connect to a sink node 120 using two or more communication protocols and/or transport mechanisms. The source node 110 is configured to transmit audio and/or video payload data to the sink node 120. The payload data 130 can be encoded using any suitable audio and/or video coder-decoder (codec) standard, including MPEG-2, H.264, VC-1, or other suitable codec standard. The payload data 130 can be transmitted directly to the sink node 120 via a wireless peer-to-peer communication protocol. The use of such direct, peer-to-peer wireless connections can be implemented without the assistance of an intermediate router. Many suitable peer-to-peer wireless connection protocols include a discovery protocol that enables devices in nearby proximity to each other to discover each other in order to establish pairing connections. For example, a peer-to-peer wireless connection implemented according to a Bluetooth standard, a Wi-Fi direct (WFD) standard, or a tunneled direct link setup (TDLS) (IEEE 802.11z) standard, can be used to send the payload data 130 via the peer-to-peer wireless connection. By providing the ability to communicate directly between two devices without the use of a third device (e.g., a router or access point), each source node (e.g., source node 110) and sink node 120 is effectively turned into an access point that can allow other WFD-enabled devices to connect with it. The bandwidth provided by selected peer-to-peer wireless connection standard used should provide sufficient bandwidth to support the amount of data sent as the payload data 130. In some examples, the Miracast standard is used to capture and encoded video that is sent according to a WFD communication protocol.

Further, control signals 140 can be sent to and from the source node 110 and the sink node 120. For example, the sink node 120 can be configured to transmit periodic beacon signals (e.g., wireless beacon signals sent via WFD or multicast domain name service (mDNS) protocol) that advertise the existence of the sink node, and may also include information notifying potential source nodes regarding services provided by the sink node 120. Further, the control signals 140 can be used by the source node 110 to probe for desired services provided by one or more sink nodes 120.

The environment depicted in the block diagram 100 further includes an access point 150. The access point can be implemented as, for example, a Wi-Fi access point implemented in an enterprise infrastructure environment, a wired access point, such as an Ethernet connection, an optical connection, or any other suitable communication technology. The source node 110 can be coupled to the access point 150 in order to send payload data 130 to the access point which, in turn, is transmitted from the access point to the sink node 120. Control signals 140 can also be transmitted to and from the access point 150 and the source node 110, as well as between the access point and the sink node 120. In some examples, the payload data and control signals sent between the access point 150 and the source node are transmitted via a wireless connection, for example an infrastructure mode Wi-Fi connection. The access point 150, in turn, is configured to send data via a wired connection, such as an Ethernet or optical connection to the sink. The infrastructure connection between the access point and the sink node may traverse a number of different nodes within an infrastructure network, including a number of routers, switches, and/or gateways.

The control signals 140 can include an indication of preferences for establishing a connection between the sink node 120 and the source node 110. For example, the sink node 120 can indicate that a direct communication connection is preferred for sending the payload data 130 versus using the access point 150.

The following terms will be used herein with regard to communications between source nodes and sink nodes. A source node is "paired" to a source node if the nodes have successfully completed capability negotiation, which includes performing a sequence of message exchanges between the source nodes and sink nodes and sink nodes to determine a set of parameters used to define the audio/video payload during streaming communication session.

A wireless peer-to-peer connection includes nodes discovery and pairing, without requiring an AP.

A Wi-Fi multimedia source node is a device that supports streaming multimedia content multimedia sink node over a Wi-Fi link. A Wi-Fi multimedia sink node is a device that receives multimedia content from a Wi-Fi multimedia source node over a Wi-Fi link and renders the multimedia content (e.g., by displaying video or playing back audio).

Source nodes and sink nodes and sink nodes discover each other's presence, prior to establishing a pairing connection. In some examples, device discovery further includes service discovery, which allows source nodes and sink nodes and sink nodes to discover each other's service capabilities prior to establishing a pairing connection. The actual operations that correspond to the foregoing terms will vary depending on the particular implementation and are readily discernible by one of ordinary skill in the art.

As we will further explain below, technologies disclosed herein can be used to negotiate which communication paths to send the payload data between the source nodes and sink nodes and sink nodes, as well as providing additional techniques for securing the data and for facilitating easier discovery and connection establishment between such source nodes and sink nodes and sink nodes. In addition, since most Miracast receivers are unmanaged and connections to these devices can be transient, it is infeasible to set the correct preference on every source node device that wants to connect to a given sink node device. By providing preference data that the sink node itself makes available to the connecting device prior to the point where the connecting device decides how to connect to the sine node, one or more of the following aspects can be achieved. For example, the decision whether to connect a source and sink node is one that is made when in proximity to the device. This avoids creation of a central policy server and the connecting source node device does not require reliance on a priori preference information to form a connection.

The disclosed technologies may also allow for preferences to be set on a per-deployment basis, since the administrator of a sink node will often have better information regarding how the sink node should be configured.

III. Example Mixed P2P Wireless/Infrastructure Wireless Environment

Figure 2:
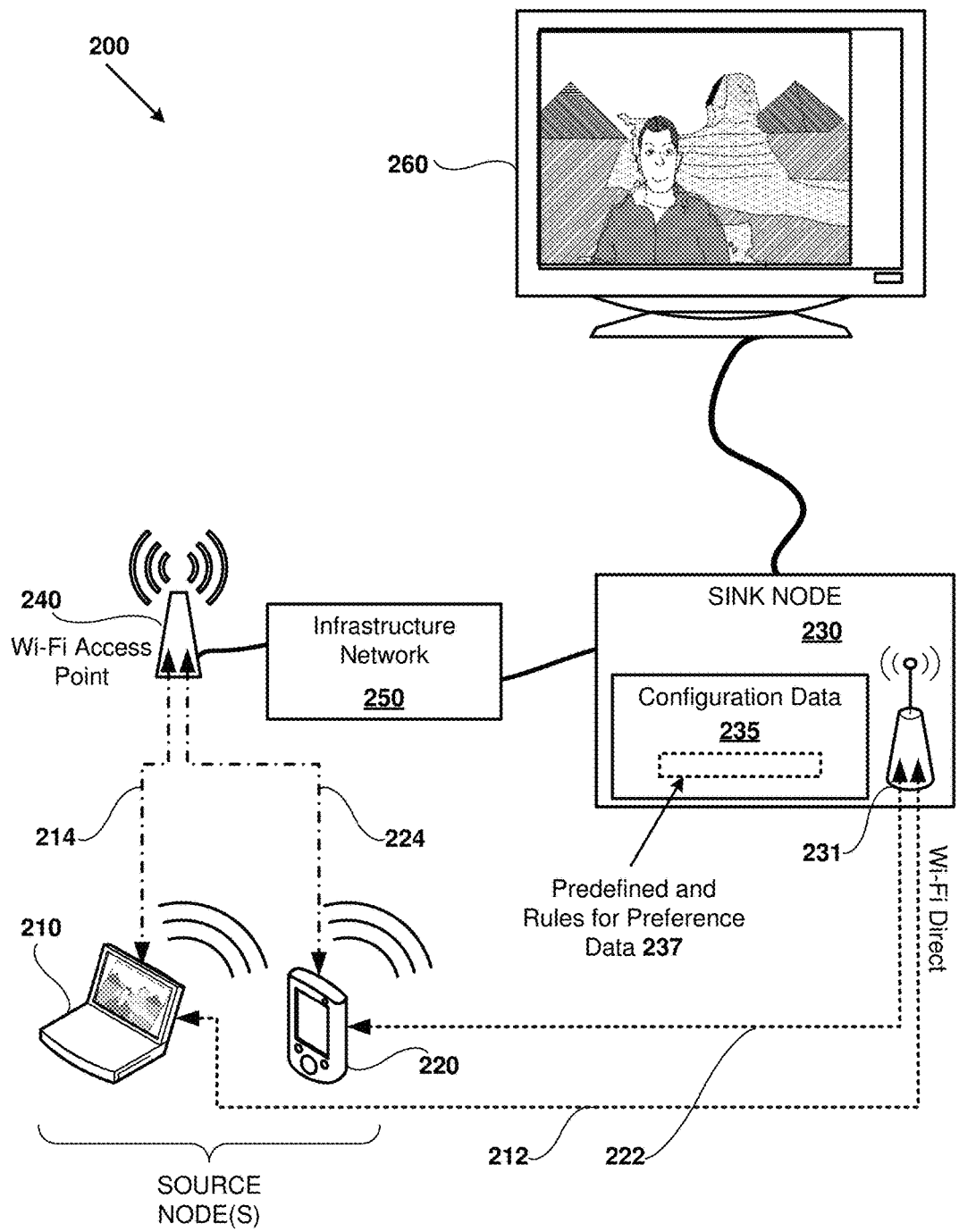
FIG. 2 is a diagram outlining an example of displaying video transmitted from a source node to a sink node, as can be used in certain examples of the disclosed technology.

FIG. 2 is a block diagram 200 further detailing an environment in which certain disclosed technologies can be implemented. A number of source nodes, including a wireless-enabled laptop 210 and a wireless-enabled mobile device 220 can be configured to negotiate connections for sending data including audio and video data to a sink node 230 receiver. Each of the source nodes 210 and 220 are adapted to send data to the sink node 230 via a peer-to-peer communication protocol path 212 and 222, respectively. The sink node 230 has a WiFi network interface 231 adapted to support peer-to-peer wireless communication.

In the illustrated example, the peer-to-peer communication protocol used is WFD, although other suitable protocols can be used to implement the direct peer-to-peer communication path. Each of the source nodes 210 and 220 are also configured to access a wireless access point 240 using infrastructure mode wireless protocols. The Wi-Fi access point 240 is, in turn, coupled to an infrastructure network 250, which network is coupled to the sink node 230. Thus, each of the source nodes 210 and 220 has a second communication path 214 or 224, respectively, that can send data to the sink node 230. For example, the second communication path 214 extends from the source node 210 to the Wi-Fi access point 240, through the infrastructure network 250 and then to the sink node 230.

The infrastructure network 250 can be implemented as a local area network (LAN), a wide area network (WAN), a virtual private network (VPN), or other suitable computing network.

In some examples, one or more of the source nodes 210 and 220 and the sink node 230 are configured to transmit audio/video data and control signals according to the Miracast protocol. The Miracast protocol allows for capturing screen display of the source node device, encoding the display into a video stream, and transmitting the data to a sink node. The sink node 230, in turn, decodes the video and/or audio stream and transmits the data for rendering on a video display 260. Audio can also be played back using speakers coupled to the display 260 or can be sent to a second sink node for reproducing the audio content.

In some examples, device discovery is initiated between one of the source nodes 210 or 220, and the sink node 230 via a wireless peer-to-peer protocol communication path. In some examples, the sink node 230 transmits a periodic beacon signal that advertises the information about the availability of the sink node, as well as services that may be provided by the sink node. The periodic beacon signal can encode indicated preferences for establishing a connection between the source nodes 210 or 220 and the sink node 230. In other modes of operation, a source node transmits a wireless discovery message that can be received by the sink node 230. Responsive to receiving the discovery message, the sink node 230 transmits a reply via the peer-to-peer communication path that includes indicated preferences for the sink node (based on preference data 237 stored in the configuration data 235), and may also include information about services that can be provided by the sink node 230. For example, the preference data 237 can indicate whether audio/video data should be sent via a peer-to-peer communication protocol path (e.g., path 212 or 222) or via a second communication path (e.g., wireless infrastructure path 214 or 224).

The indicated preference data can be generated in a number of different ways. For example, the preference data 237 can be generated from predefined values stored in configuration data 235 stored at the sink node 230. The preference data 237 can be generated from rules stored in the configuration data 235. Because the configuration data 235 is stored at the sink node 230, administration tasks are made easier. For example, in an enterprise deployment where the source nodes are a mix of desktop computers, laptops, and handheld devices, administrative management of preferences by storing preferences in configuration data 235 stored at a handful of sink nodes. For example, a single Miracast receiver or another wireless-accessible video decoder can store configuration data establishing preferences for dozens or hundreds of devices that may connect to the sink node over a period of time. As another example, enterprise managers typically have no access at all to guest devices brought in by non-employees or employee devices that are not managed by the enterprise. In such cases, guest devices can be instructed to use a particular communication path based on preferences stored in the configuration data 235 at the sink node 230.

In some examples, the preference data 237 may also include information regarding preferred resolutions for the display 260, including screen resolution, frame rate, encryption standards, security levels, security protocols, manufacturer and/or model of the sink node and/or display, or information regarding the location of the sink node or its attached display. In some examples, certain properties of the sink node can be encoded in one or more extended fields of a multicast domain name server (mDNS) encoded message based on the configuration data 235 stored at the sink node 230. In some examples, the data is encoded in an information element of a WFD connection packet. In some examples, the data is encoded in an mDNS connection packet via the infrastructure network 250.

As part of the discovery process, a source node can send an identifier to the sink node that can be used in establishing a connection between the source node and the sink node. For example, the identifier can be a name associated with the source node, a key associated with the source node, an object identifier (OID), a MAC address, or other suitable identifier. The sink node 230, in turn, can use the received identifier to attempt to establish other communication paths to the source node engaged in the discovery process. For example, the identifier can allow the sink node to identify preferred connection paths from the source node to the Wi-Fi access point 240 via the infrastructure network connection 250. For example, upon determining availability of a second communication path between the source node and the sink node using the source node as an identifier, the sink node 230 determines whether the second communication path is secured or can be secured. For example, if the Wi-Fi access point 240 does not use encryption, or uses an inferior security protocol such as Wired Equivalent Privacy (WEP) instead of Wi-Fi Protected Access (WPA) or Wi-Fi Protected Access II (WPA2) (according to the IEEE 802.11i standard); or uses WPA instead of WPA2, the sink node can determine whether such less communication paths are preferred.

In some examples, the sink node can determine that the second communication path is not secure if the second communication path is not using an encrypted connection, such as VPN (a virtual private network connection), HDCP (High Bandwidth Digital Copy Protection), or IPSec. In some examples, the sink node can determine which encryption standard and/or security protocols are being used by a wireless access point with an API provided by an operating system executing on the sink node. In some examples, the sink node can determine which encryption standard and/or security protocols are being used by a wired connection with an API to determine if IPSec, VPN, HDCP, 801.1AE, or other suitable standard or technology is in place.

It should be readily understood to one of ordinary skill in the relevant art that other criteria can be used to assess the security of the second communication path. The availability of encryption, physical access to the network, accessibility from external networks including the Internet, or other criteria can be used to determine a preference at the sink node. Thus, the sink node 230 can evaluate the security of the second communication path 214 or 224 and, if the security does not meet security criteria, indicate a preference for a direct peer-to-peer connection (e.g., 212 or 222). For example, if the second communication path includes use of a wireless access point secured using a less secure protocol (e.g., WEP) or does not use any encryption, then the sink node 230 indicates a preference for a direct peer-to-peer connection. In some examples, the sink node 230 can indicate a preference for a direct peer-to-peer connection if the second communication path is not using an encrypted connection, such as VPN or IPSec. In some examples, the sink node can assess the security of the second or other communication paths prior to any discovery be initiated for a source node. In some examples, the sink node can assess the security of the second or other communication paths prior to any discovery be initiated for a source node. The sink node can identify that an unsecured WiFi access point is not secure, and then respond based on this assessment after discovery with a source node is initiated, or to change the beacon transmitting behavior of the source node. The sink node can identify that an unsecured WiFi access point is not secure, and then indicate its transmitted preferences accordingly (e.g., in a beacon message sent by the sink node, or in response to discovery messages received by the sink node).

In some examples, the source nodes are connected to the Wi-Fi access point 240 via a wireless infrastructure connection. In some examples, the Wi-Fi direct connection uses the same network channel (e.g., both using WiFi channel 6) used to connect to the Wi-Fi access point. In other examples, different RF channels are used to establish the respective connections (e.g., one connection on channel 1 and another connection on channel 6).

Based on determining whether the second communication path is secured or can be secured, a number of actions can be taken. For example, if the second communication path is determined not to be secure, then a preference is sent to the source node indicated that a communication pairing between the source node 210 or 220 and the sink node 230 should be established via the wireless peer-to-peer protocol communication path, instead of via the infrastructure network 250. In some examples, if the second communication path can be secured, then a communication is established pairing the source node and the sink node via encrypted communication over the second communication path. For example, if the sink node 230 determines that the default level of security provided by the Wi-Fi access point 240 is insufficient, the sink node 230 can initiate a preference for, and/or require implementation of, an application level encryption protocol, such as Transport Layer Security (TLS), VPN, or High-bandwidth Digital Content Protection (HDCP). In some examples, sufficient discovery information is sent to a discovering source node to make a connection by two or more communication paths, and a connection path is selected based on the received preference data, on user preferences set at the source node, or a combination of the two.

If a sufficient level of security is available, or the sink node 230 otherwise determines that connection can be established according to the indicated preferences, then a communication pairing is established between the source node 210 or 220 and the sink node 230, and subsequent data such as video and/or audio data can be streamed from the source node to the sink node 230.

IV. Example Session Management Modules

Figure 3:
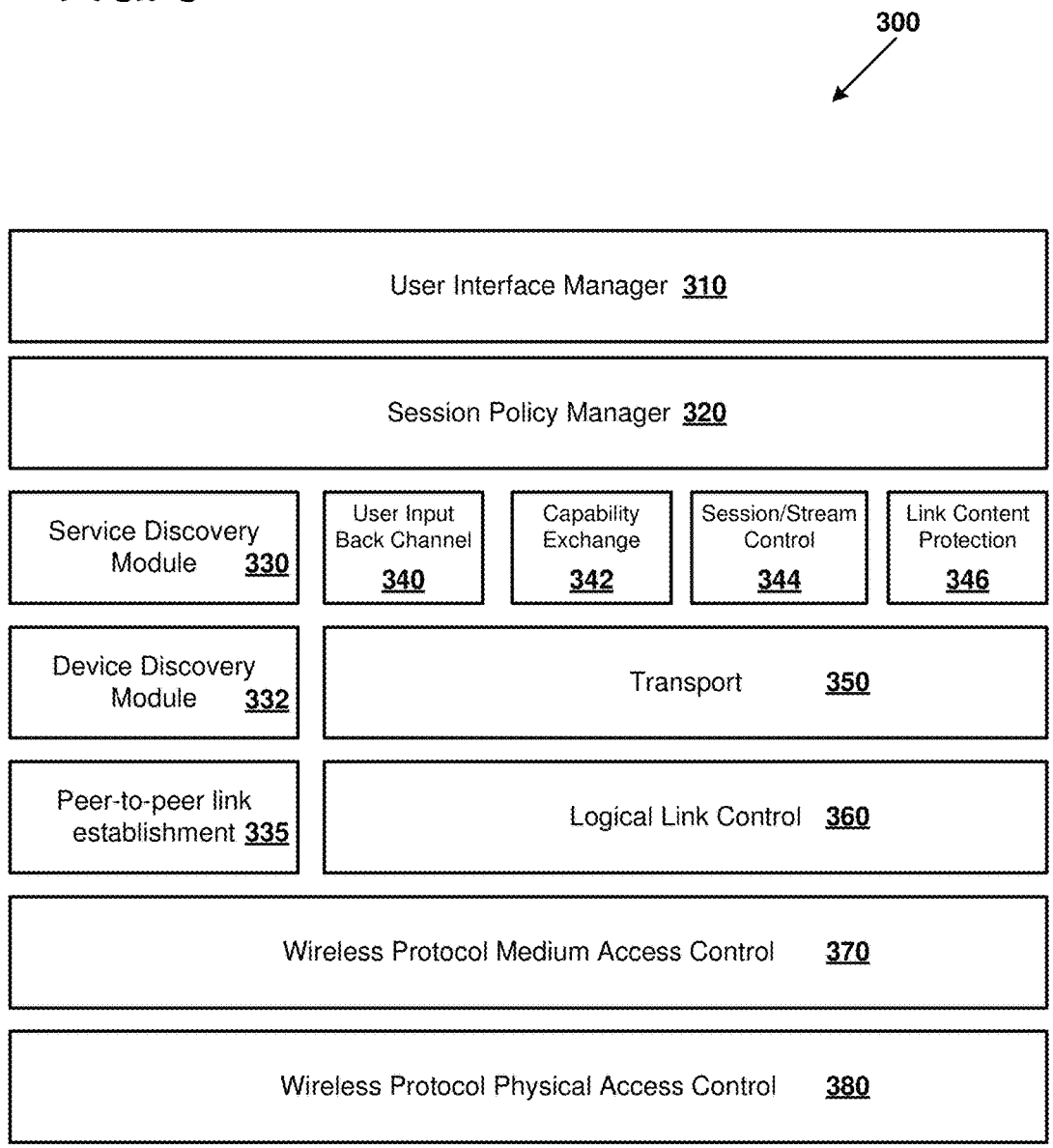
FIG. 3 is a diagram outlining example modules that can be used to implement source/sink node communication, as can be used in certain examples of the disclosed technology.

FIG. 3 depicts a model 300 used for session management of communication between paired source and sink node devices, as can be used in certain examples of the disclosed technology. For example, the illustrated model can be applied to direct wireless peer-to-peer communication, as well as infrastructure communications using wireless and/or wired protocols. As shown, a module (e.g., a module implemented with a general or application-specific processor executing computer-readable instructions) implements a user interface manager 310. The user interface manager 310 is configured to collect user input from devices such as keyboards, mice, touch screens, motion detection, or other suitable input devices that can be used to collect user input that is used to direct operation of a corresponding source or sink node. For example, the user interface manager can provide a GUI, including GUIs implemented with touch screen displays that allow users to initiate discovery, confirm pairings to selected sink nodes, and select media or screen data for streaming to a sink node.

A session policy manager 320 can be implemented with software modules and are used to control when and how payload data is generated and sent to a sink node. For example, the session policy manager 320 can include mechanisms for authorization and authentication of users and their associated devices. For example, certain users or groups may be restricted as to which sink node devices, or which communication paths, are allowed to be utilized. Certain devices associated with authorized or authenticated users, or specific privileged authorized or authenticated users, can be recognized as trusted devices, and communication preferences set differently for such trusted devices.

The illustrated model further includes a service discovery model 330, a device discovery module 332, and a peer-to-peer link establishment module 335. The service discovery module is used to process operations associated with discovery of services provided by one or more prospective sink nodes. The device discovery module 332 is used to discover and establish connections with one or more available sink nodes. The peer-to-peer link establishment module 335 is used to establish direct peer-to-peer communication, including wireless communication between a source node and a sink node, without the use of an infrastructure wireless or wired connection. The model further includes modules for providing a user input back channel 340, a capability exchange module 342, a session stream control module 344, and a link content protection module 346. The user input back channel module 340 is used to process input from user devices including keyboards, mice, touchscreens, motion sensing devices, and other suitable input devices. The capability exchange module is used to send and receive data between a source node and a sink node in order to identify capabilities of the respective source/sink nodes. For example, the capability exchange 342 can process data relating to manufacturer, model, screen resolution, color depth, three-dimensional display, supported video codecs, or other suitable capabilities. The session stream control module 344 is used to initiate and establish streaming of video and audio data, for example, using suitable video and audio codecs such as H.264, H.265, VC-1, MPEG-2, MP3, WMV, or AAC. For example, the sessions/stream control module 344 can be used to synchronize playback of the video stream between a source and a sink node. The link content protection module 346 can be used to provide additional security to payload data sent from a source to a sink node. For example, a VPN session, an HDCP session, or other suitable encryption can be used at the application level to prevent tampering or other unauthorized access to payload data sent between the source nodes and sink nodes.

The model further includes a transport module 350 which controls packetizing an encoding of data between source nodes and sink nodes according to a communication protocol, for example, TCP or UDP network protocols. A logical link control module 360 is also provided for managing logical links between various source nodes and sink nodes.

The model further includes a wireless protocol medium access control module 370 which operates at the network data link layer. For example, the medium access control module 370 can be used to control frame delimiting and recognition, network addresses for the source nodes and sink nodes, provide error correction and checking, and control access to the lower physical access layer. Examples of suitable protocols that can be controlled by the medium access control module 370 include Ethernet (IEEE 802.3), CSMA/CA (e.g., as used in 802.11 Wi-Fi wireless networks), CDMA, GSM, LTE, or other suitable network access protocols. The medium access control module 370 can also be used to establish direct peer-to-peer connections between source nodes and sink nodes.

The wireless protocol physical access control module 380 controls physical access to the transmission media, such as a wireless RF or optical communication media, a wired media, such as a CAT5 twisted pair cable, or an optical network.

Thus, implementations of the source and/or sink nodes such as those discussed above regarding FIGS. 1 and 2 can implement all or a portion of the modules described with respect to the reference model 300 in order to initiate discovery and establish communication pairings between source nodes and sink nodes.

V. Example Audio/Video Payload Processing

Figure 4:
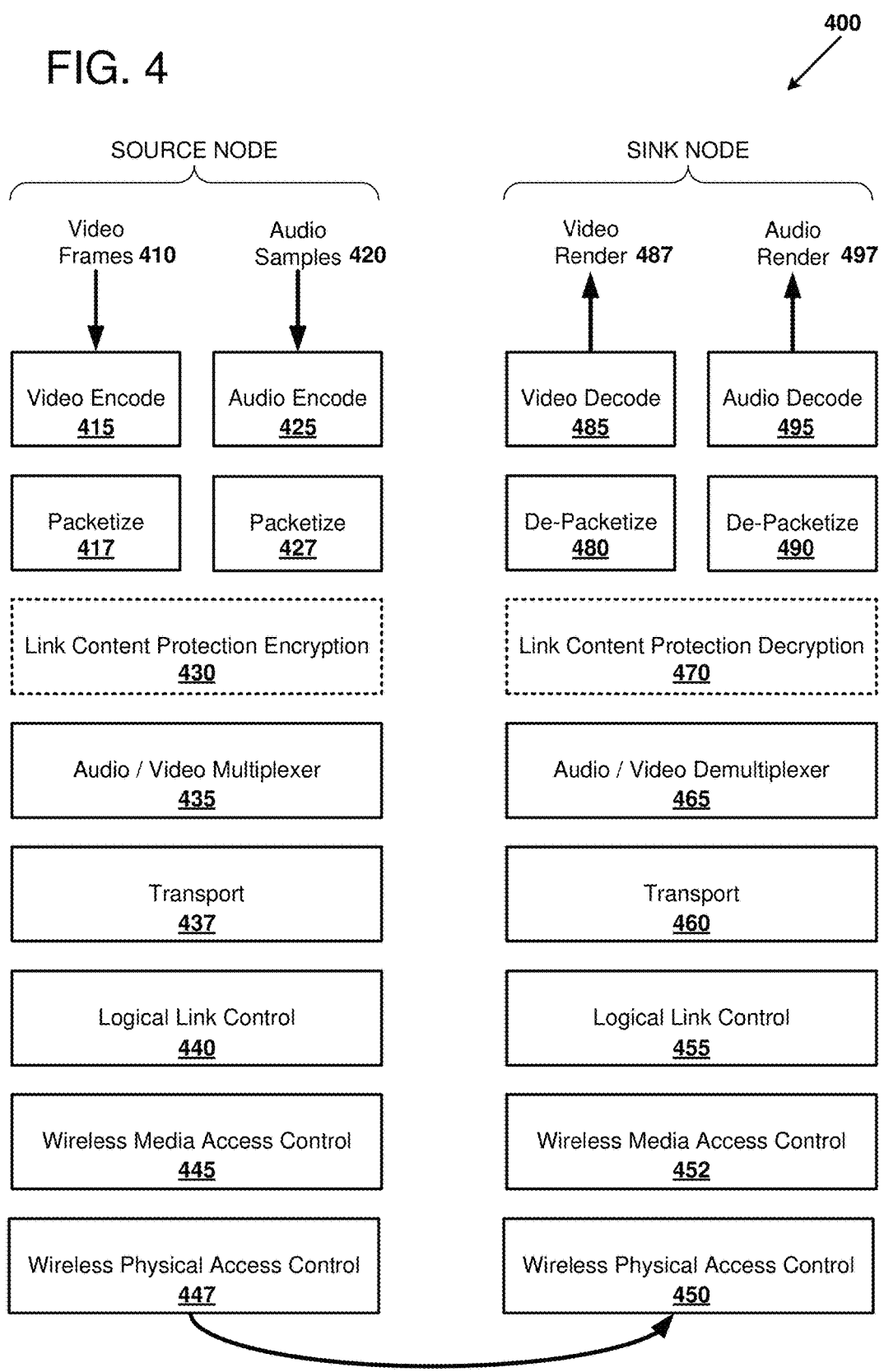
FIG. 4 outlines an example of video encoding and decoding between a source node and a sink node, as can be used in certain examples of the disclosed technology.

FIG. 4 is a diagram 400 representing a model of video and audio payload processing for data sent from a source node to a sink node, as can be performed in certain examples of the disclosed technology. For example, the hardware source node and sink nodes described above regarding FIGS. 1 and 2 can be used to implement the disclosed audio/video payload processing.

As shown, a number of video frames 410 are ingested by a video encoder 415 implemented at the source node. The video encoder can accept video data for display on the source code device, including video streams downloaded or streamed from a network, video data encoded in a DVD or Blu-Ray disk, or by capturing video data directly from one or more screens being displayed on one or more screens coupled to the source node. For example, video data stored in video RAM or other memory of the source node can be ingested by the video encoder 415. The video encoder 415 can encode the video using any suitable protocol, including H.264, H.265, VC-1, MPEG-2, or other suitable protocol. The encoded video is then broken into network packets by a packetizing module 417. Similarly, audio samples collected from network sources, computer readable media such as flash memory or disks, or audio generated by operation of a storage node can be sampled 420 and provided to an audio encoder 425. Examples of suitable encoders that can be used to encode the audio samples 420 include MP3, Windows Media Audio (WMA), Advanced Audio Coding (AAC), or other suitable encoding formats. The audio is packetized 427 typically into separate network packets. The packetized video and audio can then be provided to a link content protection encryption module 430, which applies encryption to the packetized data. For example, HDCP can be used to provide encryption across the source/sink node link. The encrypted packets are provided to an audio/video multiplexer 435 which selects video and audio and serializes for providing to the transport module 437. The transport module 437, in turn, provides the serialized packets, which have been encoded into suitable network packets such as RTP (Real-time Transport Protocol), TCP (Transmission Control Protocol), or UDP (User Datagram Protocol) network packets to provide to the logical link control module 440. The logical link control module 440, in turn, provides data to the wireless media access control module 445 which, in turn, provides the payload to a wireless physical access control module 447 which will transmit the data via, for example, a wireless RF, a wired connection, or an optical connection for transmission to a sink node.

Associated modules at the sink node will perform inverse functions in order to extract video and audio encoded across the transmission medium. This includes a wireless physical access control module 450, a wireless media access control module 452, and a logical link control module 455. A transport mechanism 460 extracts data from network packets, to be provided to an audio/video de-multiplexer 465. The audio/video de-multiplexer 465, in turn, provides the packets to a link content protection decryption module 470, if the data payload was encrypted. The link content production decryption module 470 decrypts the data and then provides it to the appropriate video or audio rendering pipeline. The video can be de-packetized 480 and then a video decoder 485 used in order to provide video frames that can be rendered 487 on one or more displays coupled to the sink node. Similarly, audio data can be de-packetized 490 and its audio decoded 495 into a signal suitable for rendering on a speaker or other device coupled to the sink node 497.

VI. Example Encoding of Preferences within Information Elements

Figure 5:
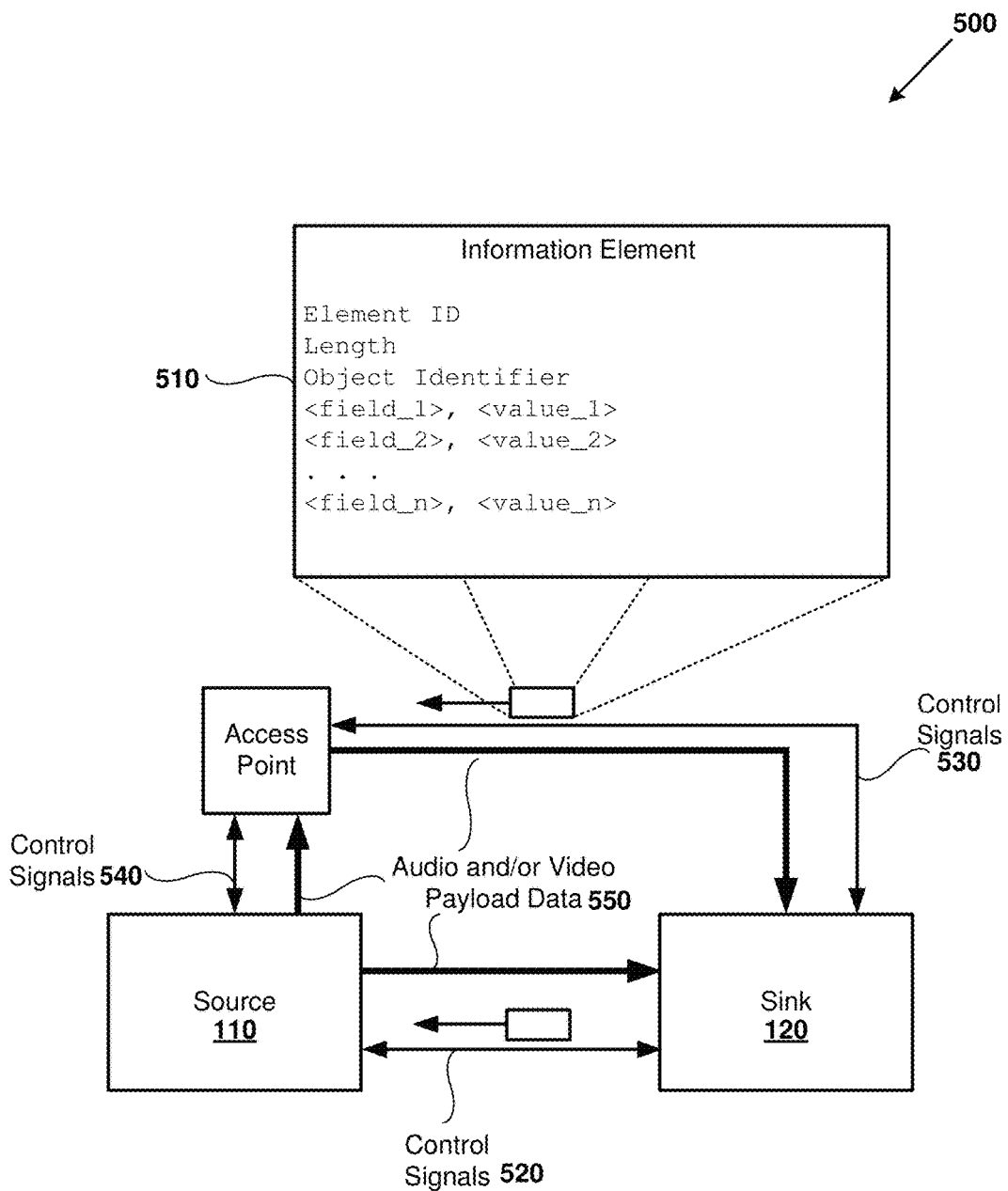
FIG. 5 is an example of encoding preference and other configuration data within an information element, as can be used in certain examples of the disclosed technology.

FIG. 5 is a block diagram 500 that depicts an example of using information elements encoded in direct peer-to-peer communication or infrastructure network communication that can be used to send preference data (as well as additional data) between the source node 110 and the sink node 120. As shown in FIG. 5, an information element 510 can be sent from the sink node 120 to the source node 110 via a direct peer-to-peer connection 520 or via an infrastructure communication path including a connection 530 to the access point and connection 540 from the access point to the source node 110. The information element includes an element identifier, which identifies the packet as an information element. A length field describes the length of data transmitted in the information element. An object identifier identifies a specific source or sink node using a unique identification number. The object identifier can be exchanged as part of the node discovery process. A number of field value pairs, for example field_1, value_1, etc. are used to incorporate data that can be used to configure a communication session. For example, one or more preferences for processing a video stream or an audio stream payload 550 can be indicated by the sink node in one or more field value pairs of the information element 510. Examples of suitable preferences that can be indicated include, but are not limited to, which communication path to select for transmitting data between sink and source nodes, whether to encrypt a connection to the sink node, an identifier of a security protocol to use for communication to the sink node, an indicator of a level of security to use in communications to the sink node, data indicating aspects of a display coupled to the sink node device, for example, resolution, color depth, support of three-dimensional rendering, or other suitable aspects, a manufacturer or model of the sink node device, or location data for the device. The location data can be encoded using a number of suitable formats including, but not limited to, a name of the device, name of a building, floor, and/or room number in which the sink node device display is located, Global Positioning System (GPS) coordinates, Cartesian or radial distances, or other suitable formats. In some examples, the information element 510 is encoded in control signals that are sent via a peer-to-peer communication packet such as a Wi-Fi direct connection packet. In other examples, the information element is encoded within the mDNS data that is sent via an infrastructure network. In some examples, the preference data includes enough information to connect via two or more of a plurality of communication paths, and a selection of a path is made based on the preference data and local user preferences. In some examples, the preference data is based at least in part of previous usage of a device. For example, preference data sent responsive to a discovery probe request can be selected based on prior usage according to user, group, manufacturer, model, capabilities, or other properties of the source node.

VII. Example Method of Determining Security of Communication Paths

Figure 6:
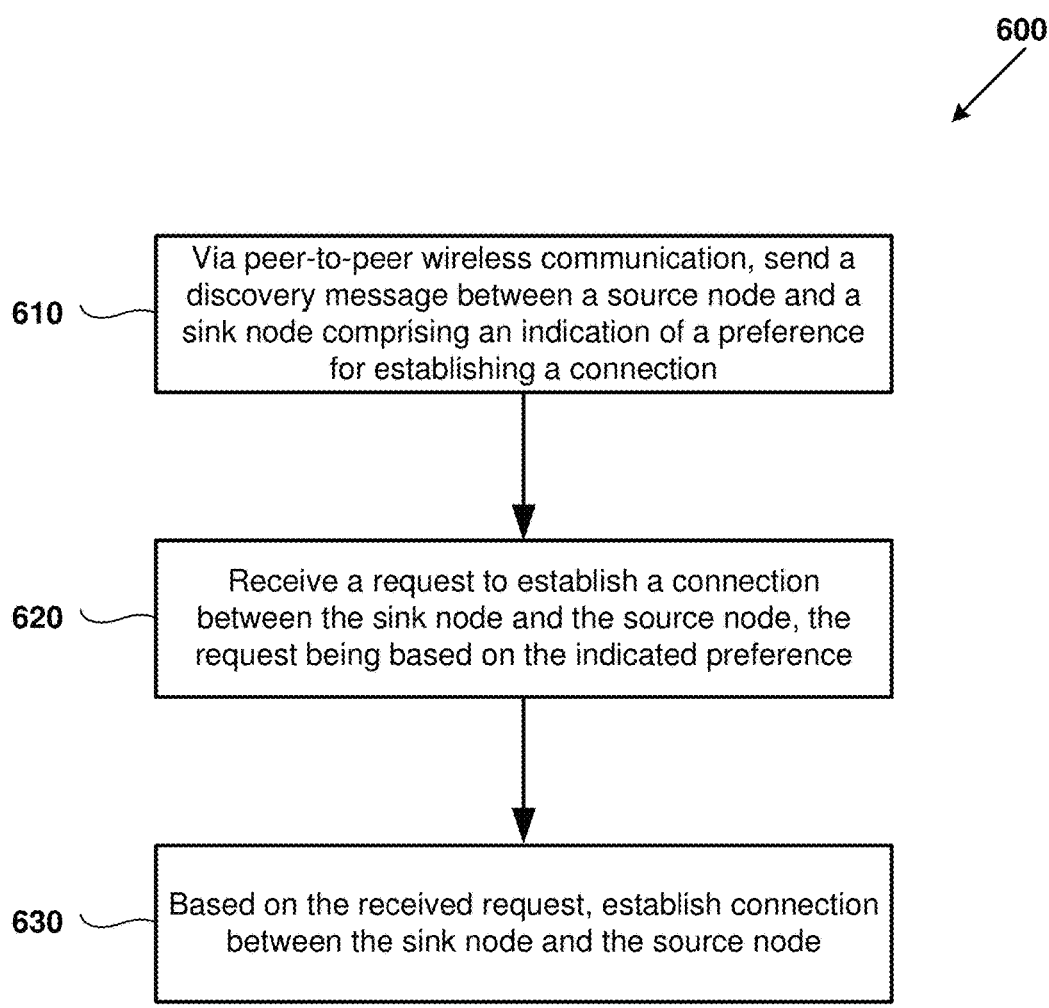
FIG. 6 is a flowchart outlining an example method of sending and using communication preferences, as can be used in certain examples of the disclosed technology.

FIG. 6 is a flowchart 600 outlining an example method of initiating discovery and establishing communication between a source node and a sink node based on preference data, as can be implemented in certain examples of the disclosed technology. For example, the computing environments detailed above regarding FIGS. 1-5 can be used to perform the disclosed method. In some examples of the disclosed technology, illustrated operations performed for different variations of the example method can be performed at a sink node, at a source node, or in a computing environment including both sink nodes and source nodes.

At process block 610, a discovery message is sent via peer-to-peer wireless communication between a source node and a sink node comprising an indication of a preference for establishing a connection. In some examples, the indicated preference is based on preference data stored in configuration data at a sink node. In other examples, the indicated preference is based on preference data that is generated at the source node. WFD is an example of a suitable peer-to-peer wireless communication protocol. In some examples, the discovery messages include sink node beacon messages that are received by a source node. In other examples, the source node initiates discovery by sending a probe message that is received by the sink node, and the sink node responds with corresponding discovery messages. It should be noted that discovery options are not limited to WFD connections, and that in some examples, other discovery techniques, such as using near field communication (NFC), audio, QR codes, or other discovery mechanisms, can supplement or replace WFD and/or mDNS discovery. In some examples, sending of discovery messages is initiated by a sink node. In other examples, a source node initiates sending of discovery messages.

In some examples, a discovery probe request is received via a peer-to-peer connection, for example, a wireless peer-to-peer connection where a source node has sent the discovery probe request. Responsive to receiving the request, the sink node sends a preference indication to the source node. It should be noted that discovery options are not limited to WFD connections or mDNS discovery, and that in some examples, other communication technologies, such as discovery using near field communication (NFC), audio, QR codes, or other discovery mechanisms, can supplement or replace WFD discovery and/or mDNS discovery.

In some examples, the sink node advertises services via broadcast messages sent via the peer-to-peer connection. The sink node can indicate preferences before or after receiving discovery requests from a source node. For example, the sink node can identify wireless access points that are reachable from the sink node and indicate a second communication path that includes the identified wireless access point as a preferred communication path. In some examples, the broadcast message may include information that at least partially identifies the second communication path as a preferred communication path.

In some examples, an identifier is received for a source node in a discovery request received via the peer-to-peer connection. For example, an identifier of a sending source node (name, MAC address, UUID, OID, or other suitable identifier of a source node) can be received at the sink node.

In some examples, the sink node sends an mDNS or WiFi-Direct encoded message as part of the discovery process that includes one or more extended fields based on configuration data stored at the sink node, the fields including an indication of one or more preferences for processing a video stream with the sink node. In some examples, the extended fields include an indication of one or more of the following preferences: whether to encrypt a connection to the sink node, an identifier of a security protocol, an indicator of a level of security, data indicating aspects of a display coupled to a device implementing the sink node, a manufacturer and/or model of a device implementing the sink node, screen resolution of a device implementing the sink node, or a location of a device implementing the sink node.

At process block 620, a request is received to establish a connection between the sink node and source node for which discovery was conducted at process block 610, based on the indicated preference data. For example, the request can indicate a communication path to use for the connection to be established. In some examples, the preferred communication path is selected based on a measurement of a quality metric for each of a number of communication paths. Number of dropped packets, ping time, bandwidth, channel noise, or other quality metrics can be used. The preference data may also include information regarding preferred resolutions for a display connected to the sink node, including screen resolution, frame rate, encryption standards, security levels, security protocols, manufacturer and/or model of the sink node and/or display, or information regarding the location of the sink node or its attached display. In some examples, certain properties of the sink node can be encoded in one or more extended fields of a multicast domain name server (mDNS) encoded message. In some examples, the data is encoded in an information element of a WFD connection packet At process block 630, based on the received request, a connection is established between the source node and the sink node. For example, if a particular communication path was indicated for connecting to the sink node, then the source node can establish a connection to the sink node via the indicated path. Further, parameters for the communication path, such as transmission rate, protocol (e.g., indication of a preferred video codec for sending encoded data), screen resolution, security parameter, or other suitable preference data can be used to set preferred or required parameters used in establishing the connection.

In some examples, the preference data may indicate to use an application level encryption to encrypt point-to-point communications between the source node and the sink node using a suitable encryption protocol such as TLS.

In some cases the preference data may indicate that it is desirable not to use direct peer-to-peer communication for streaming video and other data between the source and the sink node. In some examples, whether to use particular communication path is based, at least in part, on an identity of the user associated with the device. For example, a conference room may be setup with a sink node connected to a display and it may be desirable to route data payloads from users that are employees or other people with privileged levels associated with the infrastructure via the second communication path, while "guest" users are directed to use a direct peer-to-peer communication, so as not to use or transmit traffic over a secured infrastructure network. A system administrator can configure at least some of the preferences and store these preferences as configuration data at the sink node.

If encrypted transmission is indicated as preferred and available, then an encrypted connection can be established via a direct peer-to-peer wireless connection, or via an infrastructure connection. For example, TLS, VPN, or other suitable connection encryption protocols can be used. In some examples, if the second communication path is determined not to be secure, then a communication pairing via the second communication path is refused, or specific types of services (e.g., Miracast services) are refused.

If a peer-to-peer connection is indicated to be preferred, then pairing can be established via a peer-to-peer connection directly between the source node and the sink node. In this case, the source node will bypass transmission of data payloads via the infrastructure path.

VIII. Example Method of Controlling Discovery and Pairing

Figure 7:
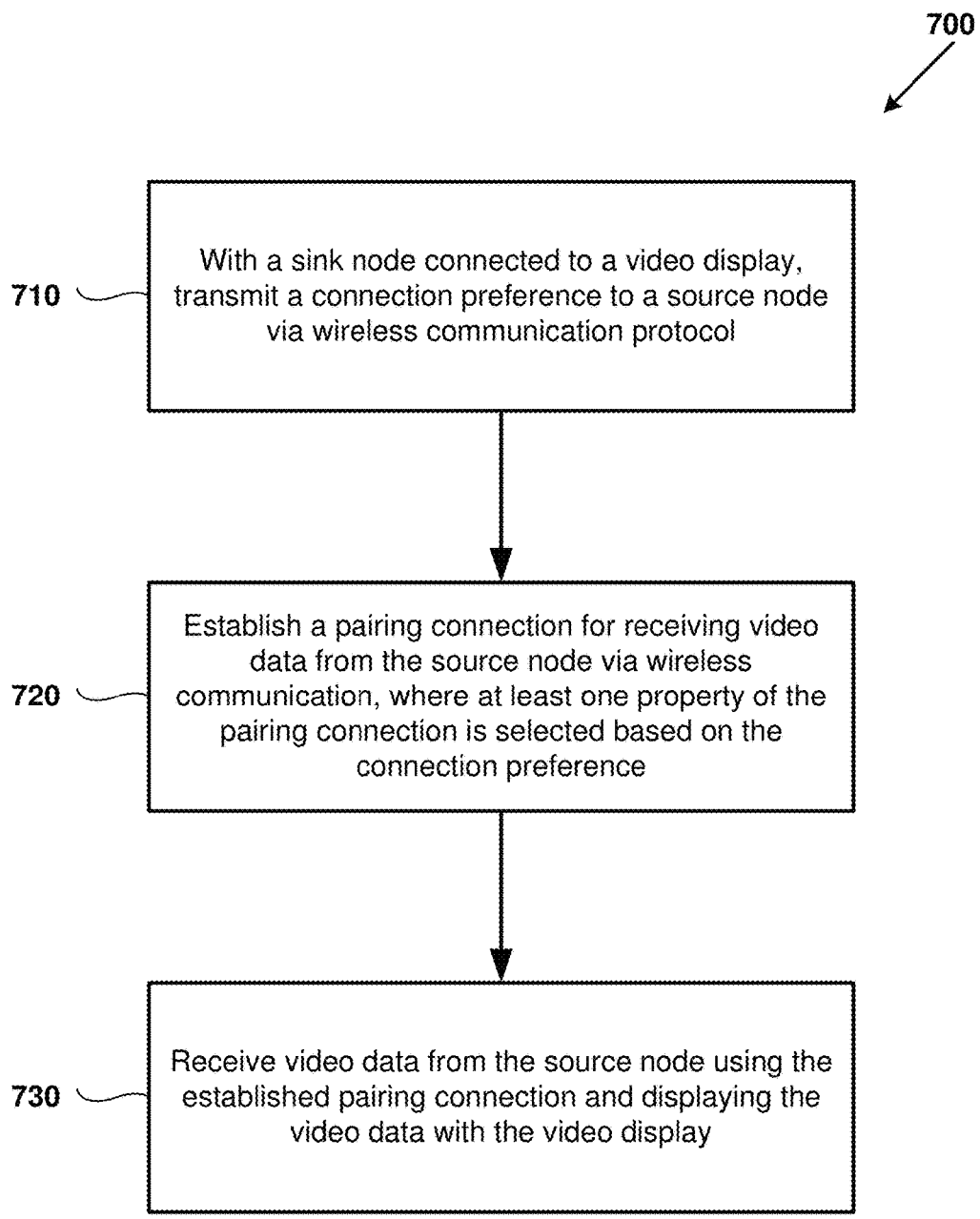
FIG. 7 is a flowchart outlining an example method of establishing a pairing connection for transmitting video according to connection preference data, as can be used in certain examples of the disclosed technology.

FIG. 7 is a flowchart 700 outlining and example method of controlling discovery and pairing in a computing environment including peer-to-peer source nodes and sink nodes and sink nodes. For example, the computing environments of FIGS. 1-5 can be used to implement the illustrated method. In some examples of the disclosed technology, illustrated operations performed for different variations of the example method can be performed at a sink node, at a source node, or in a computing environment including both sink nodes and source nodes.

At process block 710, a sink node connected to a video display transmits a connection preference via a wireless communication protocol. For example, a wireless peer-to-peer connection (e.g., Bluetooth or WFD) can be used to transmit connection preference data to a source node. An infrastructure connection (e.g., mDNS encoded packets) can be sent to the source node via a wireless access point. In some examples, the connection preference includes an indication of applicable Miracast preferences to be used in establishing the connection. In some examples, a NFC, audio, or optical connection is used to send the connection preference to the source node. In some examples, the preference is transmitted via a WFD or mDNS discovery message. In some examples, the source node is a Miracast source node and the sink node is a Miracast sink node.

At process block 720, a pairing connection for receiving video data from the source node is established via wireless communication. At least one property of the pairing connection is selected based on the connection preference send at process block 710. This can include a selection of a communication path, including communication paths other than the ones used to send the preference data at process block 710. Establishing the connection further includes conducting adequate network handshaking to establish a video and/or audio streaming connection from the source node to the sink node.

At process block 730, the sink node receives video data from the source node according to a communication path established at process block 720, the video is decrypted, decoded, and sent to a video display. In some examples, some or all of the decryption and decoding is performed at the video display. In some examples, audio data and/or user interface data is received in addition to, or instead of, the video data.

IX. Example Computing System

Figure 8:
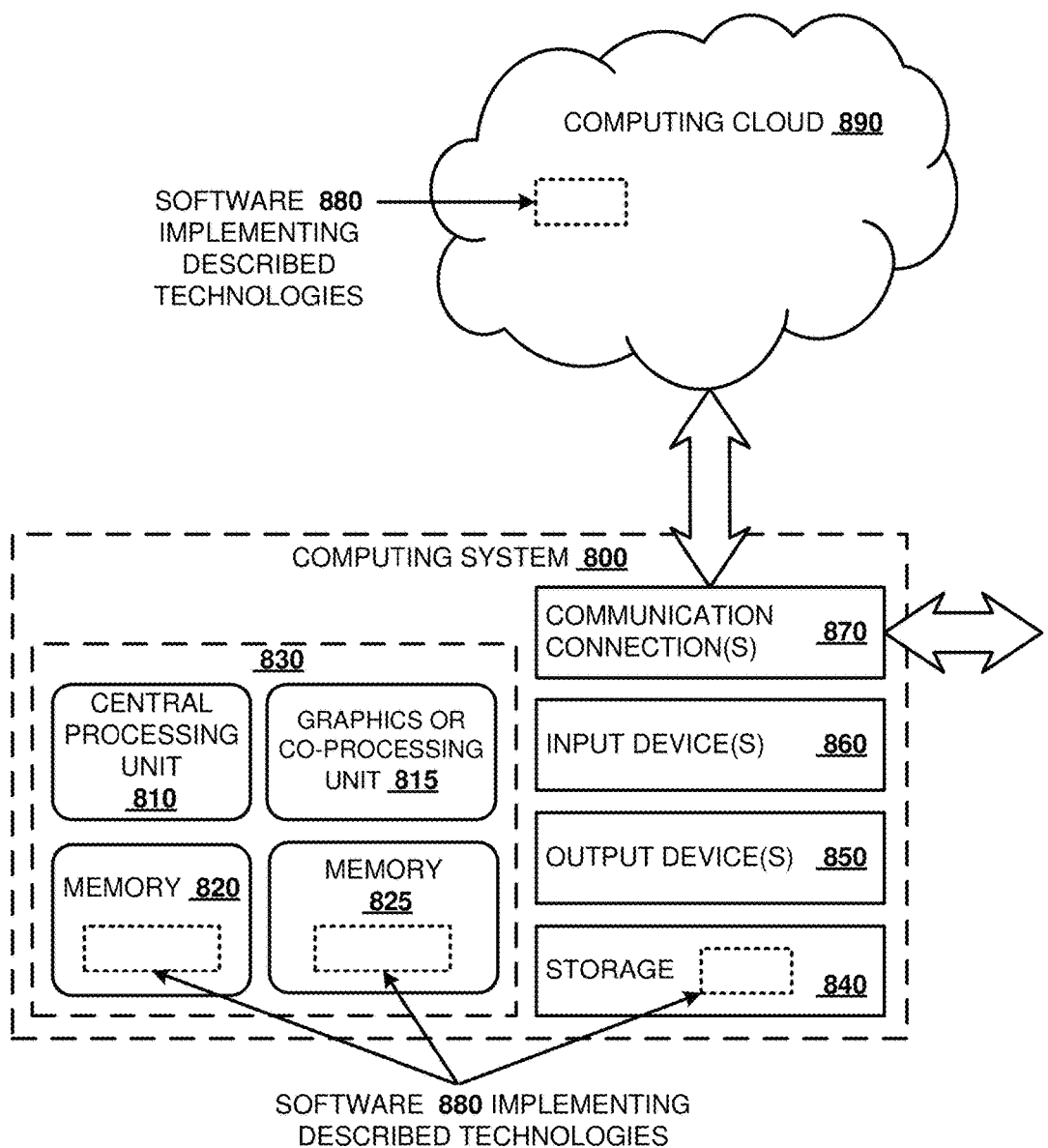
FIG. 8 is a block diagram illustrating a suitable computing environment for implementing certain embodiments of the disclosed technology.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems. For example, the computing system 800 can be used to implement hardware and software for source nodes and sink nodes disclosed herein.

With reference to FIG. 8, the computing system 800 includes one or more processing units 810, 815, non-volatile memory 820, and memory 825. In FIG. 8, this basic configuration 830 is included within a dashed line. The processing units 810, 815 execute computer-executable instructions, including instructions for implementing direct memory access (DMA) with filtering disclosed herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit (GPU) or co-processing unit 815. The tangible memory 825 may be volatile memory (e.g., registers, cache, RAM), non-volatile memory (e.g., ROM, EEPROM, flash memory, etc.), or some combination of the two, accessible by the processing unit(s). The memory 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM, CD-RW, DVD, or Blu-Ray that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

X. Example Mobile Device

Figure 9:
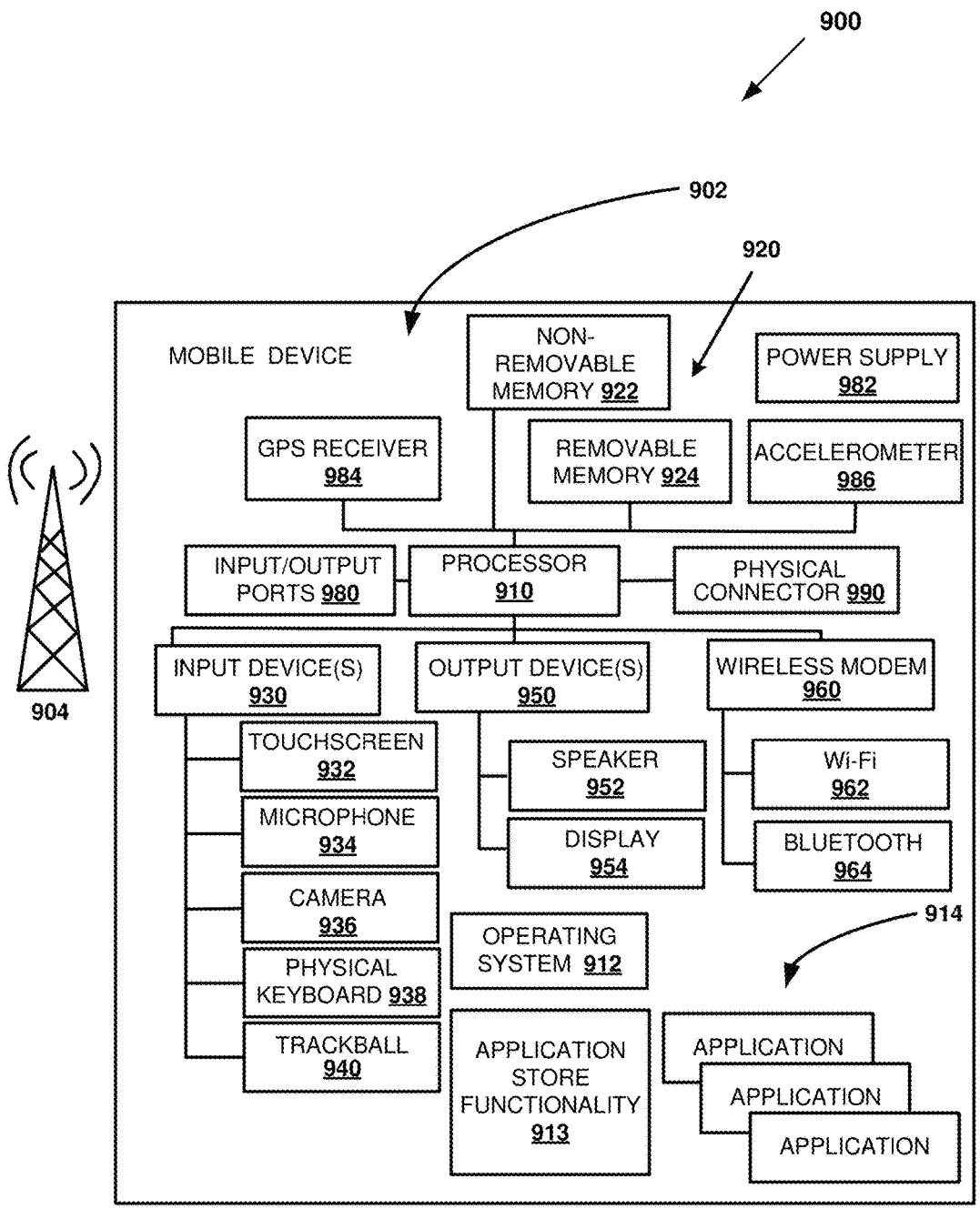
FIG. 9 is a block diagram illustrating an example mobile device that can be used in conjunction with certain embodiments of the disclosed technology.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network. In many examples of the disclosed technology, the mobile device 900 can be used to implement one or more source nodes (e.g., source node 110). In some examples, the mobile device 900 can be used to implement a sink node (e.g., sink node 120).

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

XI. Cloud-Supported Environment

Figure 10:
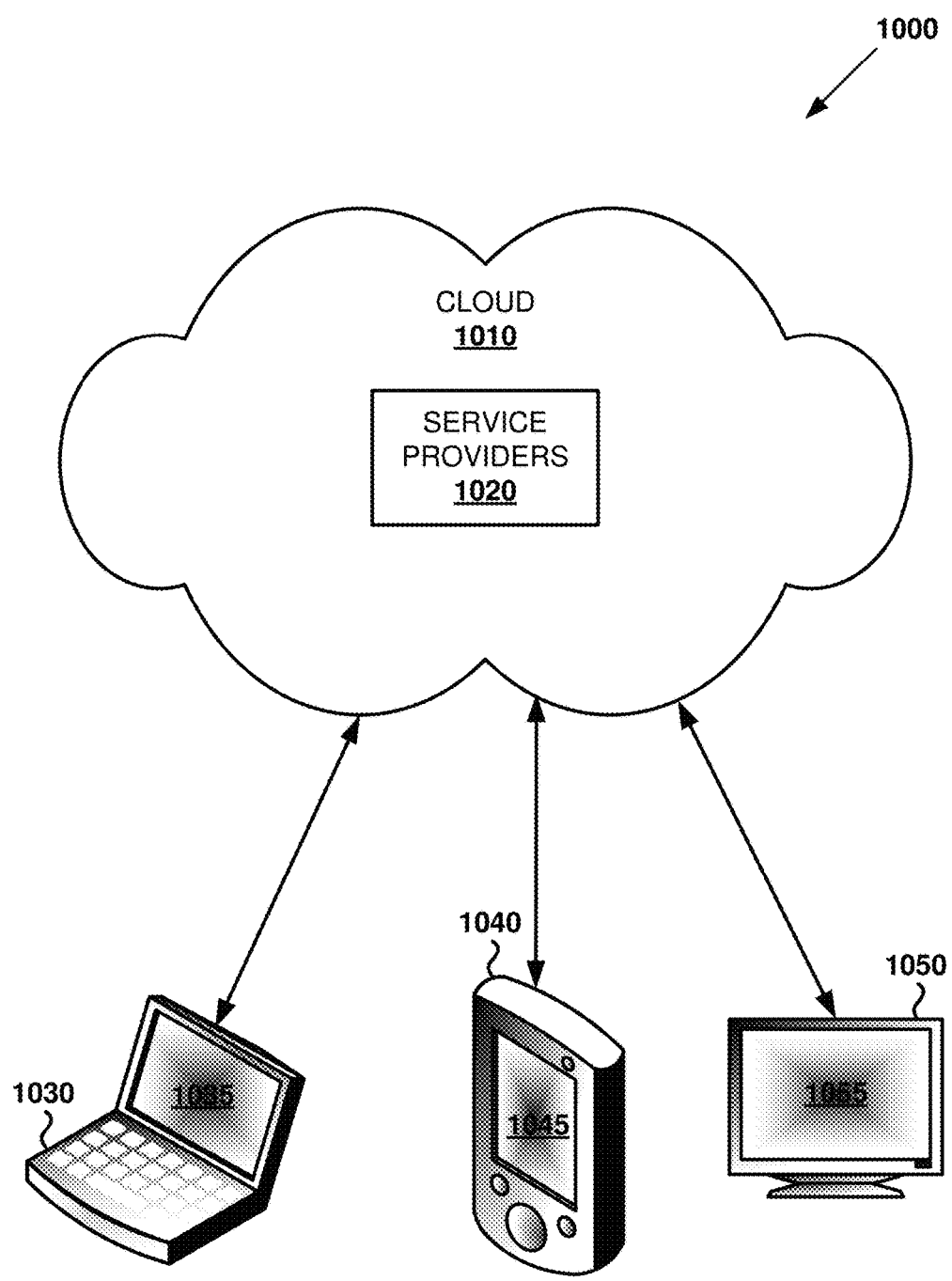
FIG. 10 is block diagram illustrating an example cloud-support environment that can be used in conjunction with certain embodiments of the disclosed technology.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010. The connected devices 1030, 1040, and 1050 can be used to implement sink and/or source nodes.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

XII. Additional Examples of the Disclosed Technology

Additional examples of the disclosed subject matter are discussed herein in accordance with the examples discussed above.

In some examples of the disclosed technology, a method is implemented with a sink node adapted to receive data via a wireless peer-to-peer communication path. The method includes, via the peer-to-peer wireless communication path, sending a discovery message to a source node comprising a preference indication including an indication of a first one of two communication paths to use for establishing a connection, receiving a request to establish a connection between the sink node and the source node, the request being based on the indicated preference, based on the received request, establishing a connection between the sink node and the source node.

In some examples, the two communication paths include a wireless infrastructure connection from the source node to a wireless access point and a peer-to-peer wireless communication path. In some examples, the discovery message is sent via a third communication path that is not either one of the two communication paths. In some examples, the preference indication is selected based on a quality measurement for one or more of the communication paths.

In some examples, the peer-to-peer wireless communication path includes one or more of: WiFi Direct, Bluetooth, or near field communication. In some examples, the sending the discovery message includes the sink node sending beacon messages comprising the indicated preference.

In some examples, the indicated preference is selected based on past usage of the sink node or the source node. For example, the sink node can use an identifier sent by the source node to determine the indicated preference if a particular communication path was used before. In some examples, if a particular communication path or other setting parameter (e.g., display resolution) that is part of the indicated preference is selected more frequently, then that setting parameter can be used in the indicated preference.

In some examples, the indicated preference is selected based on whether the source node is determined to be associated with a trusted device. For example, device associated with users or groups associated with the enterprise environment can have one or more preferences selected based on their association, while unassociated users or groups can have one or more different preferences selected based on their non-association.

In some examples, the source node performs additional operations. For example, the source node can receive the discovery message from the sink node and based on the preference indication encoded in the discovery message, send the request to establish the connection. The source node then sends one or more of the following to the sink node via the first communication path or the second communication path: video stream data, audio stream data, or user interface data.

In some examples of the disclosed technology, a method performed with a sink node connected to a video display, includes transmitting a connection preference to a source node via wireless communication, establishing a pairing connection for receiving video data from the source node via wireless communication, where at least one property of the pairing connection is selected based on the transmitted connection preference, and receiving video data from the source node using the established pairing connection and displaying the video data with the video display. In some examples, the data further includes audio data or user interface data in addition to, or instead of, the video data.

In some examples, the connection preference indicates which of a plurality of communication paths are preferred for sending video from the source node to the sink node. In some examples, the communication path is indicated by including one or more of the following: one or more network addresses (e.g., IP addresses), one or more host names or other host identifiers, one or more service set identifiers (SSIDs), an IP address, a uniform resource locator (URL), a uniform resource indicator (URI), one or more network ports, one or more protocol identifiers, or one or more nonces.

In some examples the communication paths include at least one or more of the following: a peer-to-peer wireless communication path, an infrastructure wireless path, an optical path (e.g., a fiber optic cable or an infrared wireless optical connection), a near field communication path, or an acoustic path.

In some examples, the connection preference is encoded in an information element sent in a peer-to-peer or mDNS packet. In some examples, the connection preference is encoded in a broadcast message transmitted by the sink node.

In some examples, the method includes determining whether the source node is assigned to a privileged group of users, and the connection preference is based on the determining. For example, device associated with users or groups associated with the enterprise environment can have one or more preferences selected based on their association, while unassociated users or groups can have one or more different preferences selected based on their non-association.

In some examples of the disclosed methods, the source node is a Miracast source node and the sink node is a Miracast sink node, the wireless peer-to-peer protocol communication path includes a WiFi Direct P2P connection, and the second communication path does not include the wireless peer-to-peer protocol communication path. In some examples, the methods further include sending an identifier of the Miracast source node to the Miracast sink node via the WiFi Direct P2P connection, selecting the one or more options indicated by the preference to establish the connection to the sink node, establishing a pairing connection between the source node and the sink node via the second communication path, and sending streaming video (e.g., encoded according to the MPEG-2, H.264, VC-1 coding standards) from the source node to the sink node via the second communication path. In some examples, the method further includes sending streaming audio or user interface data.

In some examples of the disclosed technology, a source node includes a wireless network interface (e.g., a WiFi direct or an 802.11a/b/g/n/ac adapter), a video encoder configured to transmit encoded video via the wireless network interface, source node memory (e.g., storage devices including volatile and/or non-volatile memory), and a processor configured to execute computer-executable instructions stored in the source node memory that when executed cause the source node to perform a method of transmitting video. In particular, the source code can include instructions for performing any of the source node methods disclosed herein. In some examples, the source node instructions include one or more of the following: instructions to receive preference data from a sink node encoded in a peer-to-peer protocol with the wireless network interface, instructions to send a request to establish a connection to the sink node, the request being based at least in part on the preference data, and instructions to establish a connection between the source node and the sink node. In some examples, the video encoder is implemented with an ASIC, an FPGA, a system-on-chip (SoC), or a processor that executes instructions stored in memory to implement the video encoder.

In some examples of the disclosed technology, a sink node includes a wireless network interface configured to receive data from the source node wireless network interface encoded according to the peer-to-peer protocol, a display interface (e.g., a digital video interface such as HDMI or DisplayPort, or an analog video interface, such as component, S-video, or composite video interface) other suitable interface to connect the sink node to a video monitor or other viewing screen), a video decoder configured to decode video received from the source node and transmit the decoded video to the sink node display interface, sink node memory (e.g., storage devices including volatile and/or non-volatile memory), and a processor configured to execute computer-executable instructions stored in the sink node memory that when executed cause the sink node to perform any of the methods disclosed herein. In particular, the sink node instructions can cause the sink node to perform a method of displaying video where the sink node instructions include instructions to send the preference data to the source node.

In some examples, the sink node is coupled to a display via the sink node display interface, and the sink node instructions further include instructions to evaluate configuration data stored in the sink node memory and select the preference data based on the configuration data. The configuration data can be stored in a file, in a database, or another suitable form.

In some examples, the sink node instructions further include instructions to evaluate two or more communication paths to the source node and the preference data includes information to establish a connection to the sink node via each of the two or more communication paths.

In some examples, a wireless access point is coupled to the sink node via, for example, a wired network connection, and peer-to-peer protocol communication is sent directly to a sink node wireless network interface.

In some examples, a system includes any one or more of the disclosed source nodes coupled to any one or more of the disclosed sink nodes.

In some examples of the disclosed technology, one or more computer-readable storage media store computer-readable instructions that when executed by a processor cause the processor to perform any of the methods disclosed herein. Further, such computer-readable storage media can be used to at least partially control the operation of the exemplary apparatus disclosed herein.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims and their equivalents.

We claim:

1. A method comprising:
  with a sink node adapted to receive data via a wireless peer-to-peer communication path:
  via the peer-to-peer wireless communication path, sending a discovery message to a source node comprising a preference indication including an indication of a first one of two communication paths to use for establishing a connection;
  receiving a request to establish a connection between the sink node and the source node, the request being based on the indicated preference; and
  based on the received request, establishing a connection between the sink node and the source node.

2. The method of claim 1, wherein the two communication paths comprise a wireless infrastructure connection from the source node to a wireless access point and a peer-to-peer wireless communication path.

3. The method of claim 2, wherein the discovery message is sent via a third communication path that is not either one of the two communication paths.

4. The method of claim 2, wherein the preference indication is selected based on a quality measurement for one or more of the communication paths.

5. The method of claim 1, wherein the peer-to-peer wireless communication path comprises WiFi Direct, Bluetooth, or near field communication.

6. The method of claim 1, wherein the sending the discovery message comprises the sink node sending beacon messages comprising the indicated preference.

7. The method of claim 1, wherein the indicated preference is selected based on past usage of the sink node or the source node.

8. The method of claim 1, wherein the indicated preference is selected based on whether the source node is determined to be associated with a trusted device.

9. The method of claim 1, further comprising:
with the source node:
receiving the discovery message from the sink node;
based on the preference indication, sending the request to establish the connection; and
sending one or more of the following to the sink node via the first communication path: video stream data, audio stream data, or user interface data.

10. A method comprising:
with a sink node connected to a video display, transmitting a connection preference to a source node via wireless communication, the connection preference indicating which of a plurality of communication paths are preferred for sending video from the source node to the sink node;
establishing a pairing connection for receiving video data from the source node via wireless communication, wherein at least one property of the pairing connection is selected based on the transmitted connection preference; and
receiving video data from the source node using the established pairing connection and displaying the video data with the video display.

11. The method of claim 10, wherein the communication paths include at least one or more of the following: a peer-to-peer wireless communication path, an infrastructure wireless path, an optical path, a near field communication path, or an audio path.

12. The method of claim 10, wherein the connection preference is encoded in an information element sent in a peer-to-peer or mDNS packet.

13. The method of claim 10, wherein the connection preference is encoded in a broadcast message transmitted by the sink node.

14. The method of claim 10, further comprising:
determining whether the source node is assigned to a privileged group of users, wherein the connection preference is based on the determining.

15. A system, comprising:
(1) a source node, comprising:
a wireless network interface,
a video encoder configured to transmit encoded video via the wireless network interface,
memory, and
a processor configured to execute computer-executable instructions stored in the source node memory that when executed cause the source node to perform a method of transmitting video, the source node instructions comprising:
instructions to receive preference data from a sink node encoded in a peer-to-peer protocol with the wireless network interface;
instructions to send a request to establish a connection to the sink node, the request being based at least in part on the preference data, and
instructions to establish a connection between the source node and the sink node; and
(2) the sink node, comprising:
a wireless network interface configured to receive data from the source node wireless network interface encoded according to the peer-to-peer protocol,
a display interface,
a video decoder configured to decode video received from the source node and transmit the decoded video to the sink node display interface,
memory, and
a processor configured to execute computer-executable instructions stored in the sink node memory that when executed cause the sink node to perform a method of displaying video, the sink node instructions comprising:
instructions to evaluate two or more communication paths to the source node, the preference data including information to establish a connection to the sink node via each of the two or more communication paths, and
instructions to send the preference data to the source node.

16. The system of claim 15, further comprising a display coupled to the sink node display interface, wherein the sink node instructions further comprise:
instructions to evaluate configuration data stored in the sink node memory and select the preference data based on the configuration data.

17. The system of claim 15, further comprising:
a wireless access point coupled to the sink node via a wired network connection, wherein peer-to-peer protocol communication is sent directly to a sink node wireless network interface.

* * * * *